No. 801,198. PATENTED OCT. 10, 1905.
I. C. ADRIANCE.
FLOOR FOR HORSE STALLS.
APPLICATION FILED DEC. 12, 1904.
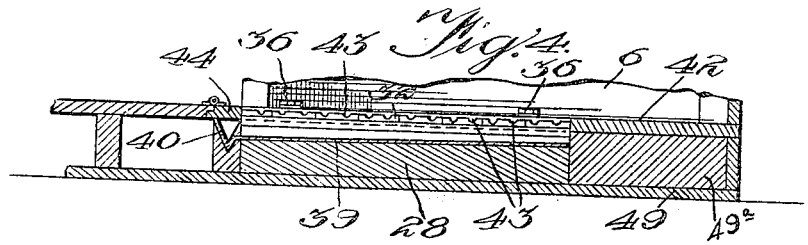
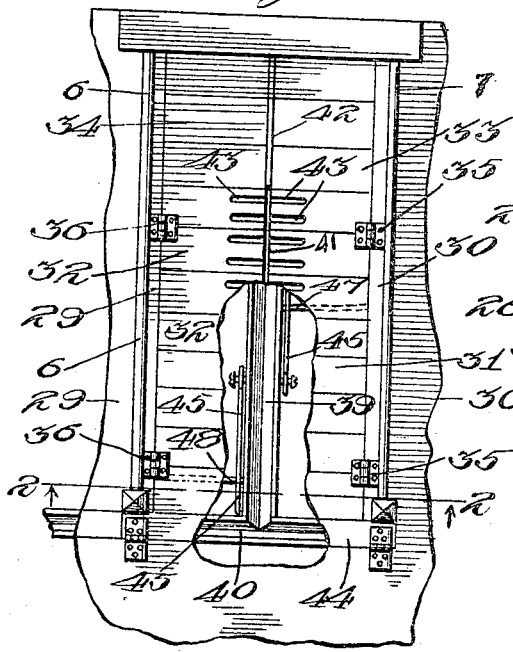
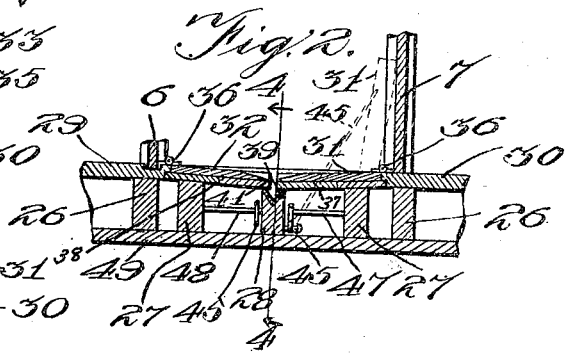
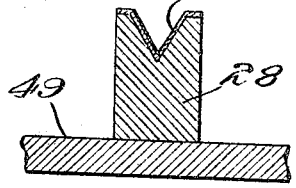
Witnesses:
JBWeir
G.V. Domarus
Inventor.
Isaac C. Adriance
by Francis A. Hopkins
Atty

UNITED STATES PATENT OFFICE.

ISAAC C. ADRIANCE, OF CHICAGO, ILLINOIS.

FLOOR FOR HORSE-STALLS.

No. 801,198.  Specification of Letters Patent.  Patented Oct. 10, 1905.

Application filed December 12, 1904. Serial No. 236,442.

*To all whom it may concern:*

Be it known that I, ISAAC C. ADRIANCE, a citizen of the United States, residing at Chicago, in the county of Cook and State of Illinois, have invented certain new and useful Improvements in Floors for Horse-Stalls, of which the following is a full, clear, and exact specification.

My invention relates more particularly to that class of floors for horse-stalls which are provided with hinged sections and subgutters or drains.

My invention has for its primary object to provide a floor for stalls of the described character which shall be simple, inexpensive, and efficient and possess certain improvements and advantages over other forms of floors, which will first be described with reference to the accompanying drawings, and then more particularly pointed out in the claims.

In the said drawing, Figure 1 is a plan view of my improved floor. Fig. 2 is a cross-section thereof on the line 2 2, Fig. 1. Fig. 3 is an enlarged detail cross-section of the central floor-support and gutter. Fig. 4 is a vertical longitudinal section taken on the line 4 4, Fig. 2.

The invention is shown in conjunction with a single stall having side walls 6 7.

26 27 28 are the joists on which the flooring is supported, and one of these, the joist 28, is so arranged that it will lie longitudinally of the stall substantially midway between the side walls. The flooring is constituted by two side strips 29 30, which preferably run longitudinally of the stall the full length thereof, and a number of short cross strips or boards 31 32 33 34, arranged at right angles to the strips 29 30. The two series of short cross-boards 31 32 are respectively made into two hinged sections like hinged trap-doors and are respectively connected at their outer edges to the longitudinal strips 30 29 by suitable hinges 36 35, these trap-doors or hinged sections extending longitudinally of the stall from the rear end to a point at or beyond that at which the front feet of the animal would ordinarily stand, and the flooring forwardly of this point is constituted by the cross-sections 33 34, which are supported in any suitable way, and, if desired, rest upon a joist 49ª, continuing from joist 28; but they are preferably of the same length and other dimensions as the boards 31 32, so that when the boards 31 32 wear very thin from the stamping of the horse's hoofs they may be taken up and transposed with the boards 33 34 or with any of the other boards 31 32 that are situated at a place where there is no substantial wear. The short boards 31 32 may be supported directly upon longitudinal boards 37 38, respectively, running lengthwise of and taking their support directly upon the joists 27 28, the outer edges of the boards 37 38, if desired, being extended slightly beyond the ends of the boards 31 32 and rabbeted in the edges of the side strips 29 30 to form a tight joint.

In the upper edge of the joist 28 is formed a gutter extending longitudinally thereof and which, if desired, may be provided with any suitable lining 39, and this gutter connects, if desired, with a cross-gutter 40 at the foot of the stall, which runs past all of the stalls, and the boards 31 32, constituting the hinged flooring, are arranged at a slight distance apart at their ends throughout the length of the hinged sections, so as to form a crack or slot 41 directly over the gutter 39, and in order that the boards 33 34 may be of the same length as the boards 31 32 and the space between their ends may be closed a strip 42, equal in width to the slot 41, is introduced between them on top of the joist 28. The boards 31 32 have the grain of the wood running transversely of the stall, and they are also inclined toward their inner or contiguous ends—that is, toward the slot 41, but longitudinally of the stall. The hinged floors constituted by these boards are from front to rear horizontal, as shown in Fig. 4, so that the animal's fore and hind quarters will not be raised or lowered relatively, but the animal will have a slightly-inclined surface to lie upon, whereby he will rest with more comfort and will be assisted in rising by the inclined character of the floor and the slot 41, which affords a purchase for the hoofs. In this respect the animal is also assisted by a number of grooves 43, formed in the lower ends of the boards 31 32 and serving also as drains. The gutter 40 may be covered, if desired, by a hinged section 44, so that it may be readily cleaned. The hinged sections of the floor constituted by the boards 31 32 may be held in their upturned positions as long as desired by any suitable props 45, pivoted to the sides of the joist 28 and adapted to be supported in a horizontal position accessible to the hand of the operator when not in use by cross-bars 47 48. When the hinged sections are thus turned back out of the way, any particles of the bedding or other refuse that may have accumulated under the flooring upon the subfloor 49 may be removed and the entire under part of the stall subjected to ventilation. It will also be seen that such particles will ordinarily find their way into the central trough or gutter 39 and may be removed from these, if desired, without lifting the hinged sections by simply drawing a suitable implement along the slot 41, the trap or hinged section 44 being thrown back to receive it from the lower end of the gutter 39.

Having thus described my invention, what I claim as new therein, and desire to secure by Letters Patent, is—

1. In a stall the combination of a central gutter running longitudinally of the stall, and two upwardly-movable, impervious floor-sections inclined downwardly toward said gutter and having their ends arranged at a distance apart, forming a longitudinal slot extending over said gutter lengthwise thereof.

2. In a stall the combination of a central gutter extending longitudinally thereof, and two upwardly-movable impervious floor-sections inclined downwardly toward said gutter with their contiguous edges arranged at a distance apart and forming a longitudinal slot over said gutter extending lengthwise thereof, said floor-sections being composed of boards arranged transversely of the stall.

3. In a stall the combination of a central gutter extending longitudinally thereof, and two upwardly-movable floor-sections having their contiguous edges arranged at a distance apart over said gutter, said floor-sections being each composed of short sections of boards extending transversely of the stall on their upper sides and longitudinal boards extending lengthwise of the stall supporting said short sections from below.

4. In a stall the combination of a central gutter extending longitudinally thereof, and a flooring covering said gutter and having a slot extending longitudinally of the stall directly over said gutter, said flooring being composed of a fixed part and two upwardly-movable parts and the said fixed and movable parts being composed of sections of boards of uniform dimensions whereby they may be interchanged or transposed, and said slot being constituted by arranging the movable parts at a distance apart.

ISAAC C. ADRIANCE.

Witnesses:
F. A. HOPKINS,
M. B. ALLSTADT.